United States Patent
Cohen et al.

(10) Patent No.: US 7,028,724 B2
(45) Date of Patent: Apr. 18, 2006

(54) FUELING NOZZLE WITH INTEGRAL MOLECULAR LEAK SENSOR

(75) Inventors: Joseph Perry Cohen, Bethlehem, PA (US); Frank Kenneth Schweighardt, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 220 days.

(21) Appl. No.: 10/452,549

(22) Filed: May 30, 2003

(65) Prior Publication Data
US 2004/0237631 A1    Dec. 2, 2004

(51) Int. Cl.
*B65B 1/30*    (2006.01)

(52) U.S. Cl. .............................. 141/94; 141/4; 141/83; 141/392

(58) Field of Classification Search ................ 141/2–8, 141/83, 94, 95, 98, 285, 286, 290, 392, 59
See application file for complete search history.

(56) References Cited

U.S. PATENT DOCUMENTS

| | | | |
|---|---|---|---|
| 4,782,302 A | 11/1988 | Bastasz et al. | 324/71.3 |
| 5,012,672 A | 5/1991 | McKee | 73/31.07 |
| 5,279,795 A | 1/1994 | Hughes et al. | 422/98 |
| 5,834,627 A | 11/1998 | Ricco et al. | 73/23.31 |
| 5,932,797 A | 8/1999 | Myneni | 73/40.7 |
| 6,293,137 B1 | 9/2001 | Liu et al. | 73/31.06 |
| 6,341,629 B1* | 1/2002 | Clark et al. | 141/83 |
| 6,387,329 B1* | 5/2002 | Lewis et al. | 422/98 |
| 6,418,983 B1* | 7/2002 | Payne et al. | 141/59 |
| 6,755,225 B1* | 6/2004 | Niedwiecki et al. | 141/231 |
| 6,810,925 B1* | 11/2004 | Graham et al. | 141/98 |

* cited by examiner

*Primary Examiner*—Timothy L. Maust
(74) *Attorney, Agent, or Firm*—Keith D. Gourley

(57) ABSTRACT

An apparatus and process for measuring the concentration of hydrogen gas being transferred through a nozzle from a source container to a destination container and for providing an alert and/or taking action where hydrogen gas leaks may create an unsafe condition. The invention can accurately and reproducibly respond to and measure the absolute hydrogen gas concentration within the nozzle housing using hydrogen gas sensors that are selective only to hydrogen, which do not require the presence of oxygen to operate and which do not saturate when hydrogen safety levels are reached. These sensors are positioned inside the nozzle housing to allow for the direct and immediate knowledge of the presence of hydrogen gas that cannot be safely determined by other means. An apparatus and process for detecting leaks of liquid hydrogen through a nozzle during transfer of liquid hydrogen from a source container to a destination container are also discussed.

32 Claims, 8 Drawing Sheets

FUELING NOZZLE WITH INTEGRAL MOLECULAR LEAK SENSOR

BACKGROUND OF THE INVENTION

The present invention relates generally to chemical detection and more particularly to an apparatus and process for the measurement of hydrogen, a flammable material, when the hydrogen is being transferred from one storage container to another storage container.

Based on the literature and general good practices to those skilled in the art of transferring toxic and/or flammable material from one storage container to another container, only external "leak" detection devices have been used, i.e., gas detectors that alert the proper personnel once the flammable material has "escaped" to the open environment from the supposedly-closed system. For example, when natural gas is transferred, usually a mercaptan (e.g., tertiary butyl mercaptan, isopropyl mercaptan, normal propyl mercaptan, dimethyl sulfide mercaptan, and methyl ethyl sulfide) is combined with the natural gas flow simply to provide an odor that can be detected by a person in the vicinity of the natural gas leak to alert that person that a leak is occurring.

For the past several years, where hydrogen is the flammable material being transferred, gas detector devices available on the market have utilized thermal conductivity technology, electrochemical technologies, metal-oxide semiconductor (MOS) technologies, or optical technologies all of which suffer from the disadvantages discussed below. For example, thermal conductivity sensors may pose an "ignition source" problem that can ignite leaking hydrogen, when the hydrogen concentration is greater than about 4% per volume; electrochemical and MOS technologies require the presence of oxygen to operate; optical sensors cannot get wet or be exposed to a wet environment and therefore must typically be used in a clean and dry environment.

One type of conventional device used as a flammable gas detector is the combustible gas indicator (CGI) such as that sold by Mine Safety Appliances Co. of Pittsburgh, Pa., as well as other safety device manufacturers. The CGI is one of the most widely used instruments to provide a warning to safety responders when flammable substances in the atmosphere begin to approach their explosive limits. Most fire departments and industrial facilities have such instruments. The CGI is a non-specific detector that detects flammable gases in the atmosphere. Its operation is based upon the catalytic combustion of the flammable gas on a filament in a detector known as a "Wheatstone Bridge". The CGI is calibrated with a flammable gas (e.g., hexane) using a known concentration referenced to NIST (National Institute of Standard Technology). The burning of this known concentration of the calibrant gas on the filament (relative to a reference "cool" filament) produces a signal, which is directly proportional to this specified concentration of the calibrant gas. In the field, the detection of a different flammable gas produces a signal that can be related to the response of the calibrant gas by pre-determined "response factors" that are provided by the manufacturer of the instrument. However, as mentioned earlier, this approach cannot be used within the fueling nozzle because of its mode of operation, because its hot wire-filament, can cause an unsafe condition, by generating a spark source.

For hydrogen, the flammable detection means requires substantial amounts of oxygen (e.g., >10%) be present, best applied to metal oxide semiconductor (MOS) sensor technology. This is also not acceptable because mixing air, or oxygen, with hydrogen (i.e., 4%–74% hydrogen in air or 4%–90% hydrogen in oxygen) in the presence of an ignition source (e.g., at least 0.02 millijoules), results in a dangerous condition. Currently, MOS-based sensors as primary information providers are widely used in many fields of technology and industry for environmental analysis. The most ardent problems of MOS-based sensor manufacturing are the reproduction of resistive properties and possibility of the formation of thin film metal oxide sensitive layers in certain configurations.

Another commercial means of flammable gas detection involves use of a catalytic bead sensor (which also requires the presence of oxygen). This type of sensor is made from two separate elements or "beads" that surround a wire operating at a high temperature (approximately 450° C.). A first element, the active element, is made by winding a small coil of wire, sealing it in a ceramic substance, and then coating it with a catalyst to promote a reaction with the gas. The second element, the reference element, is made identical to the active element except in place of the catalyst, a passivating substance is used to prevent this bead from reacting with the gas molecules. The reference bead compensates for changes in ambient temperature, humidity, and pressure variations. The beads are generally placed in separate legs of a Wheatstone bridge circuit. In theory, when gas comes into the environment, it has no effect on the passivated bead, but has a significant effect (primarily in terms of temperature) on the catalyzed bead. The increase in heat increases the resistance; the difference between the readings of the wires in the two beads forms the sensor signal. However, catalytic bead sensors operate above a threshold or "turn-on" voltage corresponding to the bead temperature that can, in the presence of the catalyst and oxygen, first ignite the gas. As the sensor ages, the catalyst slowly deactivates on the bead. The threshold voltage gradually increases, and the sensor sensitivity decreases. At the same time, changes in the wire coil cause increased zero drift and noise. The result is the sensor must be replaced. When a mixture of combustible gas or vapor in air diffuses through the sensor flame arrestor, it oxidizes on the catalytically-treated sensing bead. Since this oxidation reaction is exothermic, it causes an increase in the temperature of this bead (in relationship to the temperature of the reference bead) and a resulting increase in the electrical resistance of a small platinum coil embedded in this bead. The change in resistance in the embedded platinum coil is proportional to the amount of chemical energy released by the oxidation reaction. Electronic circuitry (e.g., a transmitter) immediately detects this increase in resistance and reduces electrical power to the bead until the original platinum coil resistance is restored. The amount of electrical power removed is linearly proportional to the combustible gas concentration present.

Electrochemical sensors utilize a technology similar to fuel cells. Fuel cells consist of an electrolyte with an anode on one side and a cathode on the other. They create electricity by passing a gas (usually hydrogen) over the anode and oxygen over the cathode. The two electrodes are separated by an electrolyte. This produces electricity, water, and heat. Electrochemical sensors work the same way. The gas passing over the electrode creates a chemical reaction and electrical current. The current generated is proportional to the amount of gas in the cell. In order for these to work, there must be oxygen on the other side of the cell.

Various gas sensor configurations are shown in U.S. Pat. No. 5,279,795 (Hughes et al.); U.S. Pat. No. 6,293,137 (Liu et al.); U.S. Pat. No. 5,012,672 (McKee); U.S. Pat. No.

4,782,302 (Bastasz), U.S. Pat. No. 5,834,627 (Ricco et al.); and U.S. Pat. No. 5,932,797 (Myneni).

There remains a need for an apparatus/method that provides for the measurement of hydrogen levels when transferring hydrogen from one container to another while utilizing a hydrogen sensor that is selective only to hydrogen and does not cross interfere with other species, does not rely on temperature differentials (e.g., thermal conductive sensors such as catalytic bead sensors), oxygen (e.g., electrochemical and MOS sensors) and does not require a clean and dry environment (e.g., optical sensors) and which can be positioned inside a nozzle transferring the hydrogen without saturating the sensor.

BRIEF SUMMARY OF THE INVENTION

A first embodiment of the invention relates to a nozzle for dispensing hydrogen gas from a hydrogen gas source into a container and for detecting hydrogen gas leaks. The nozzle comprises a housing having a portion that is adapted for coupling to an opening of the container; and at least one sensor that is positioned inside the nozzle and wherein the sensor detects the concentration of hydrogen and emits a signal indicative of the concentration of hydrogen.

A second embodiment of the invention relates to a method for detecting hydrogen gas leaks during the transfer of hydrogen gas from a hydrogen gas source into a container. The method comprises the steps of providing a nozzle, coupled at one end to a transfer line from the hydrogen gas source, and having an output at its other end; positioning at least one sensor inside the nozzle, and wherein the at least one sensor emits a signal indicative of the concentration of hydrogen it is detecting while hydrogen is being transferred; coupling the at least one sensor to a controller, and wherein the controller receives the signal indicative of the concentration of hydrogen; coupling the output end of the nozzle to an opening of the container; initiating transfer of hydrogen gas from the hydrogen gas source to the container; and alerting an operator or shutting off the transfer of hydrogen gas, by the controller, whenever the controller determines that the received signal has reached or exceeds a predetermined hydrogen concentration.

A third embodiment of the invention relates to a hydrogen gas transfer monitoring and control system for dispensing hydrogen gas from a hydrogen gas source into a container and for responding to hydrogen gas leaks. The monitoring and control system comprises: at least one nozzle that is coupled to a hydrogen gas source via a transfer line and control valve; the nozzle comprises: a housing having a portion that is adapted for coupling to an opening of the container; and at least one sensor that is positioned inside the nozzle, wherein the sensor detects the concentration of hydrogen and emits a signal indicative of the concentration of hydrogen; and a controller, electrically-coupled to the at least one sensor and coupled to the control valve, and wherein the controller alerts personnel and/or controls the control valve whenever the controller determines that the signal has reached or exceeds a predetermined hydrogen concentration.

A fourth embodiment of the invention relates to a nozzle for use in a transfer system for dispensing liquid hydrogen from a liquid hydrogen source into a container and for detecting the undesirable entry of oxygen into the system. The nozzle comprises: a housing having a portion that is adapted for coupling to an opening of the container; and an oxygen sensor, positioned inside the nozzle, for detecting the concentration of oxygen when the liquid hydrogen is not flowing and wherein the sensor emits a signal indicative of the concentration of oxygen.

A fifth embodiment of the invention relates to a method for detecting the undesirable entry of oxygen into a transfer system that transfers liquid hydrogen from a liquid hydrogen source into a container. The method comprises the steps of: providing a nozzle, coupled at one end to a transfer line from the liquid hydrogen source, and having an output at its other end; positioning an oxygen sensor inside the nozzle and coupling the sensor to a controller; coupling the output end of the nozzle to an opening of the container; emitting a signal, by the oxygen sensor, indicative of the concentration of oxygen in the transfer system before liquid hydrogen begins transferring, and wherein the signal is received by the controller; and preventing the transfer of liquid hydrogen until the oxygen is removed from the transfer system.

A sixth embodiment of the invention relates to a nozzle for use in a transfer system for dispensing liquid hydrogen from a liquid hydrogen source into a container and for detecting the undesirable entry of oxygen into the system. The nozzle comprises a housing having a portion that is adapted for coupling to an opening of the container and another portion coupled to a transfer line from the liquid hydrogen source, wherein the transfer line comprises an oxygen sensor therein, and wherein the oxygen sensor detects the concentration of oxygen when the liquid is not flowing and wherein the sensor emits a signal indicative of the concentration of oxygen.

BRIEF DESCRIPTION OF SEVERAL VIEWS OF THE DRAWINGS

The invention will be described by way of example with reference to the accompanying drawings, in which.

DETAILED DESCRIPTION OF THE INVENTION

The present invention provides an apparatus and method for accurately measuring the hydrogen concentration within a hydrogen fueling nozzle during transfer of hydrogen from one storage container to another storage container and automatically alerting and/or safely controlling such transfer as required.

Figure 1:
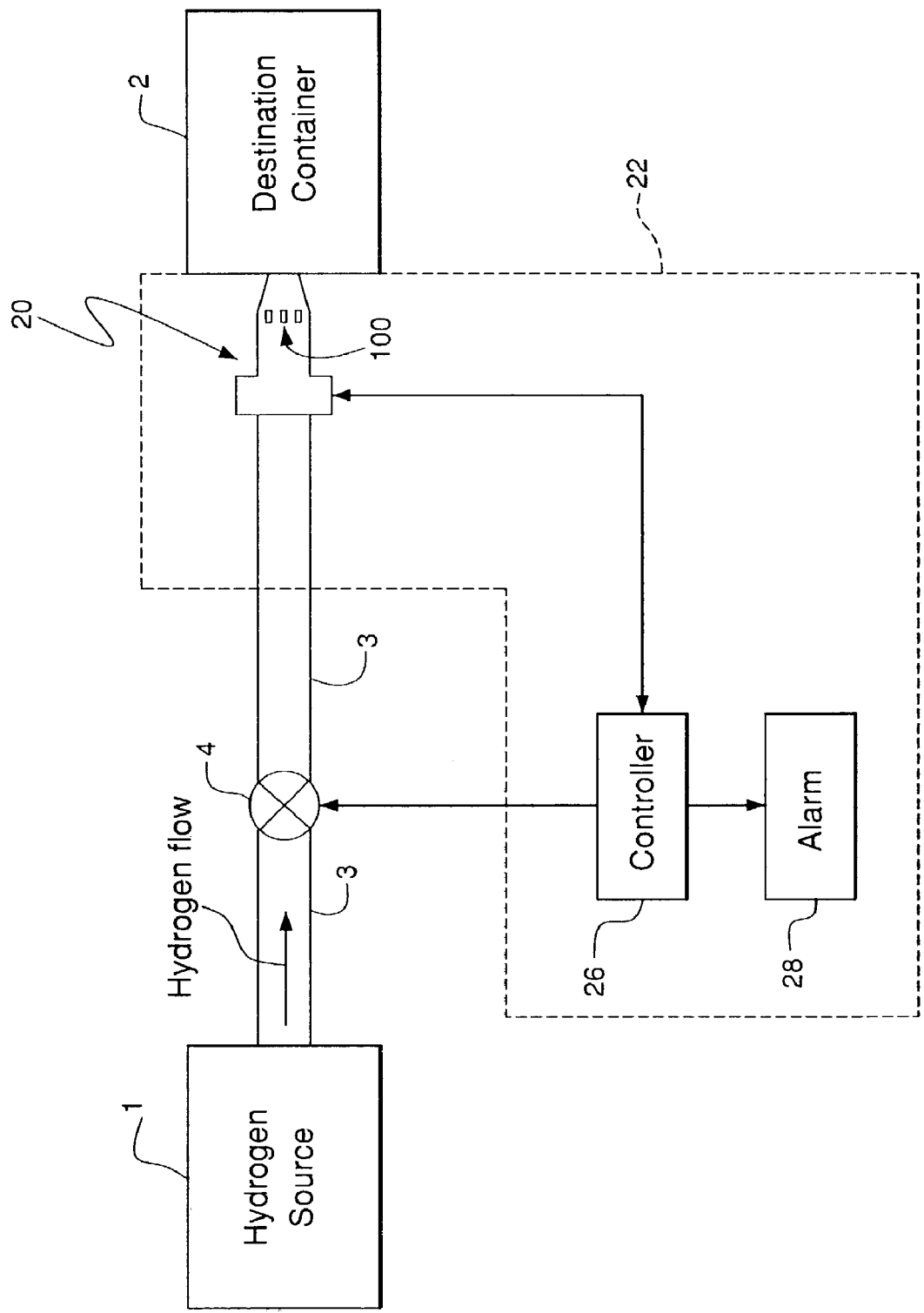
FIG. 1 is a block diagram showing the hydrogen fueling nozzle of the present invention used with a monitoring & control system for transferring hydrogen between containers.

As shown in FIG. 1, hydrogen is transferred from a first container 1 to a second or "destination" container 2 via a transfer line 3 and the fueling nozzle 20. The first container 1 may comprise any supply source such as a pressure vessel (wherein a pressure vessel is defined as a closed container capable of withstanding internal pressure greater than ambient pressure, and in as used in this Specification, typically less than 900 atmospheres), or hydrogen generator such as a hydrolysis unit or a reformer, a gas compressor, or a liquid hydrogen pump. The second container 2 may comprise a pressure vessel.

Furthermore, this fueling nozzle 20 forms part of a monitoring and control system 22 that also comprises a controller 26 and alarm 28. As will be discussed in detail later, the fueling nozzle 20 informs, via the use of molecular sensors 100 internal to the nozzle housing, the controller 26 of the absolute concentration of the hydrogen in transit and the controller 26 can activate a series of alarms 28, if necessary, and can even stop the flow of the hydrogen, where required, by controlling, e.g., a transfer valve 4. In particular, the molecular sensors 100 emit a signal indicative of the current concentration of hydrogen to the controller 26.

As used throughout this Specification, the term "internal" means "within or on the nozzle" and excludes any location off of the outside surface of the nozzle. To that end, as will be discussed in detail below, the term "internal" includes any and all locations inside or on the nozzle such as but not limited to the normal flow path of the hydrogen gas through the nozzle, the walls of the nozzle, seals in the nozzle, shafts, valves, shrouds, rings, etc. that form any portion of the nozzle.

It should be understood that the preferred embodiment of the fueling nozzle 20 is for use with hydrogen gas transfer. However, it is within the broadest scope of this invention to include a fueling nozzle, also using internal sensors, for transferring liquid hydrogen from one container to another container; the discussion of such a fueling nozzle for transferring liquid hydrogen will be discussed later.

Figures 2, 5:
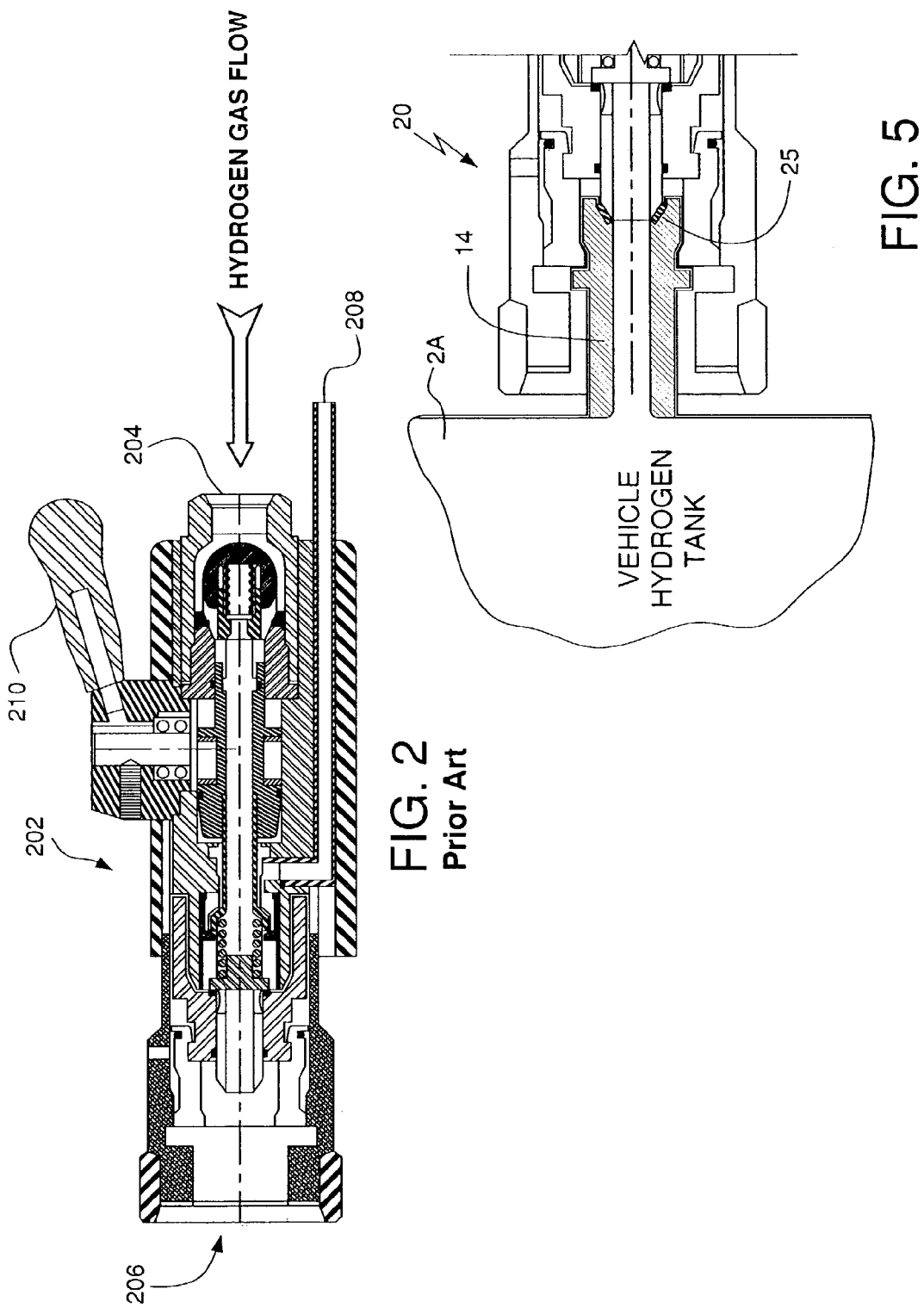
FIG. 2 is a cross-sectional view of a high pressure gas nozzle using a double block and bleed configuration.
FIG. 5 is a partial cross-sectional view of the nozzle of the present invention coupled to the fueling port of a vehicle.
Figure 3:
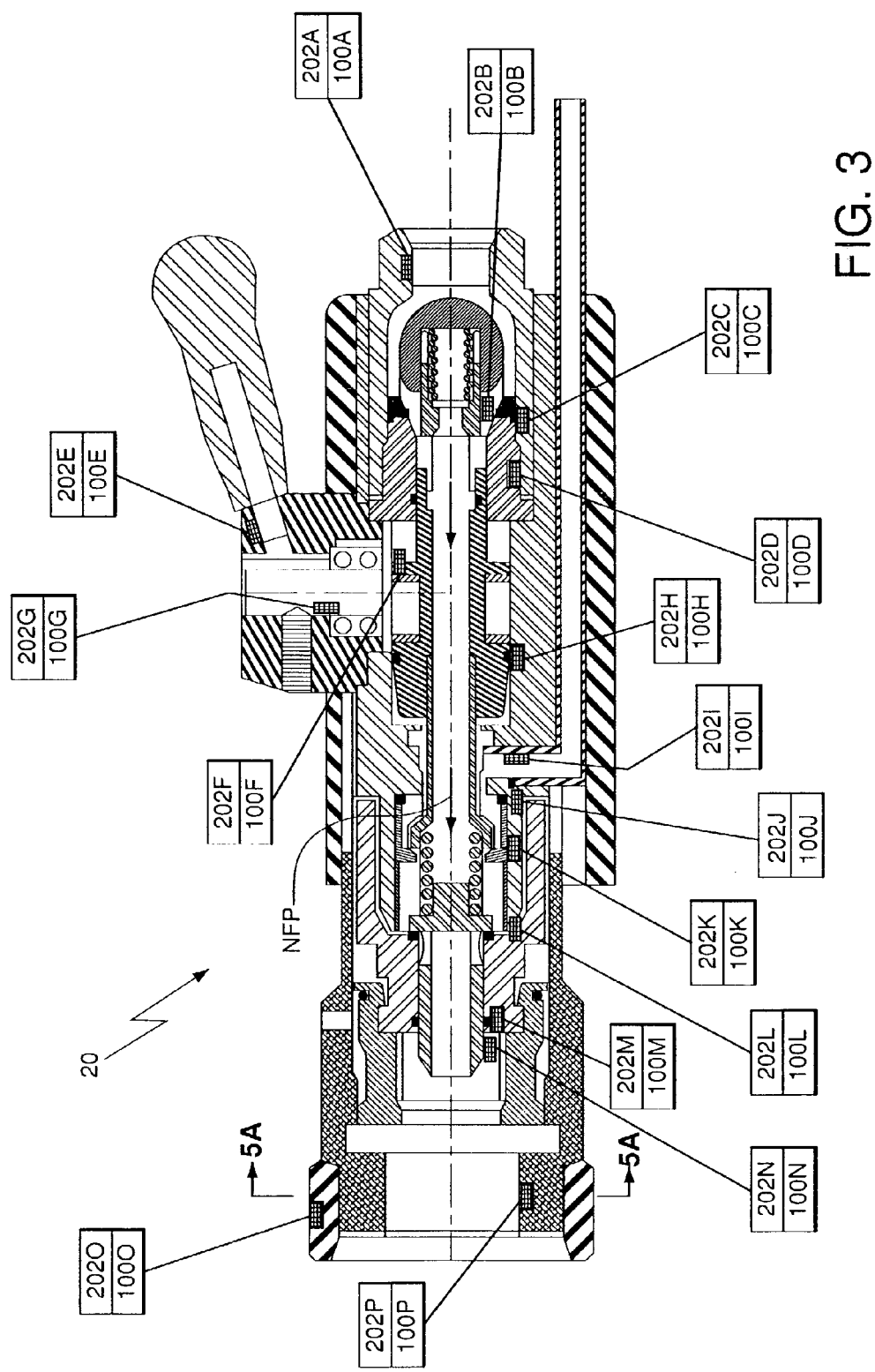
FIG. 3 is a cross-sectional view of the present invention showing the high pressure gas nozzle of FIG. 2 using the internal hydrogen gas (IHG) sensors.

FIG. 3 shows a cross-sectional view of the nozzle 20 of the present invention which comprises a typical high pressure gas nozzle 202 (FIG. 2) that includes internal hydrogen gas sensors 100, and whereby the normal flow path (NFP) of the hydrogen gas is shown. As will be discussed in detail later, one of the important features of the present invention 20 is that these hydrogen sensors 100 are positioned internal to the gas nozzle 202, not external to the nozzle housing. It should be understood that the high pressure gas nozzle 202 (FIG. 2) is shown by way of example only and that any high pressure gas nozzle 202 could be used.

In particular, the exemplary gas nozzle 202 depicted in FIG. 2 comprises a "double block and bleed nozzle" construction having an input 204, an output 206, a vent 208, and a control handle 210. In the present invention 20 (FIG. 3), the internal hydrogen gas sensors 100 are positioned at locations within the nozzle housing 202 that may be prone to leaks, i.e., locations having a seal, seat and/or O-ring. For example, the following are candidate hydrogen gas sensor locations inside the nozzle housing 202:

| Nozzle Housing 20 Location | Location Reference Number | IHG Sensor Number | H$_2$ Concentration Range |
|---|---|---|---|
| inlet module housing | 202A | 100A | 0–50K ppm |
| inlet valve | 202B | 100B | 0–50K ppm |

-continued

| Nozzle Housing 20 Location | Location Reference Number | IHG Sensor Number | H$_2$ Concentration Range |
|---|---|---|---|
| O-ring | 202C | 100C | 0–50K ppm |
| inlet valve seal seat | 202D | 100D | 0–50K ppm |
| handle block | 202E | 100E | 0–50K ppm |
| Bushing sub-assembly | 202F | 100F | 0–50K ppm |
| eccentric shaft | 202G | 100G | 0–50K ppm |
| wear ring | 202H | 100H | 0–50K ppm |
| O-ring | 202I | 100I | 0–50K ppm |
| valve seal | 202J | 100J | 0–50K ppm |
| seal tensioner | 202K | 100K | 0–50K ppm |
| O-ring | 202L | 100L | 0–50K ppm |
| O-ring | 202M | 100M | 0–50K ppm |
| step seal | 202N | 100N | 0–50K ppm |
| Protection sleeve | 202O | 100O | 0–50K ppm |
| Shroud | 202P | 100P | 0–50K ppm |

By positioning these hydrogen gas sensors 100 at these internal nozzle locations, the sensors 100 can accurately detect the absolute concentration of hydrogen gas at these internal locations and therefore permit the monitoring and control system 22 to automatically respond (when necessary) to these detected levels. In addition, all of these sensors 100 are positioned in the nozzle 20 for ease of maintenance/removal.

Figure 4:
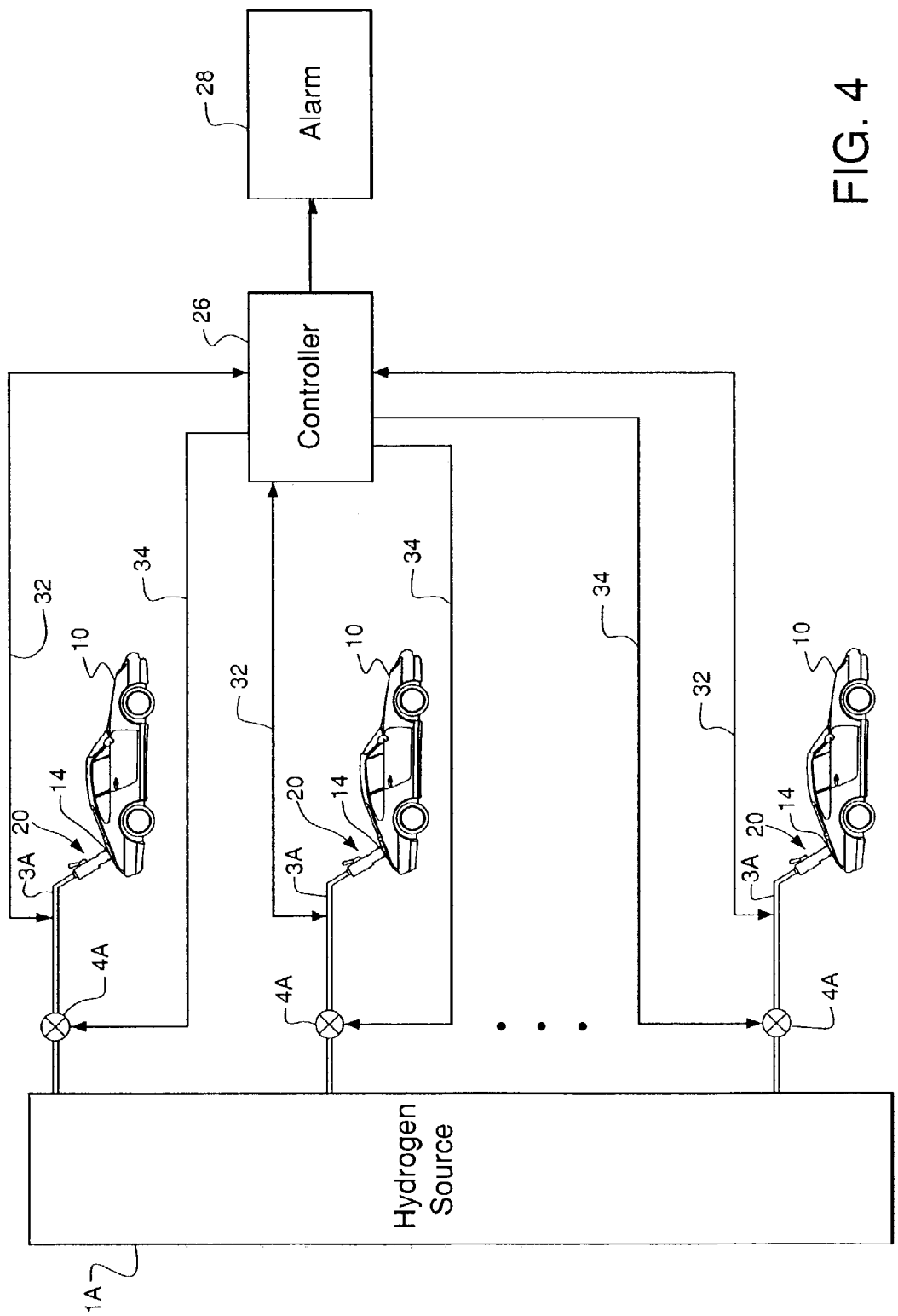
FIG. 4 is a functional diagram of an exemplary hydrogen fueling station that utilizes the present invention.

For example, as shown in FIG. 4, a hydrogen fueling station is depicted using a plurality of these fueling nozzles 20 which include these internal hydrogen gas sensors 100 (hereinafter "IHG sensors 100"). Each fueling nozzle 20 is coupled to a common hydrogen source 1A via respective control valves 4A. Each IHG sensor 100 is independently coupled to the controller 26 for providing an electrical signal from each sensor 100 in the nozzle 20 representing the respective hydrogen concentration detected, as well as for providing excitation (e.g., 24VDC) to the sensor 100. A wire harness 32 represents all of the signal/power cabling from each of IHG sensors 100 to the controller 26 for each nozzle 20. A control cable 34 is coupled between the controller 26 and each control valve 4A that allows the controller 26 to shutdown a particular hydrogen transfer, if necessary. Vehicles 10 (or other destination hydrogen containers) can be then be positioned adjacent a corresponding a fueling nozzle 20. As shown clearly in FIG. 5, the nozzle output 206 is adapted for coupling (for effecting a tight seal) to a fueling port 14 of the vehicle's hydrogen tank 2A.

Figure 5A:
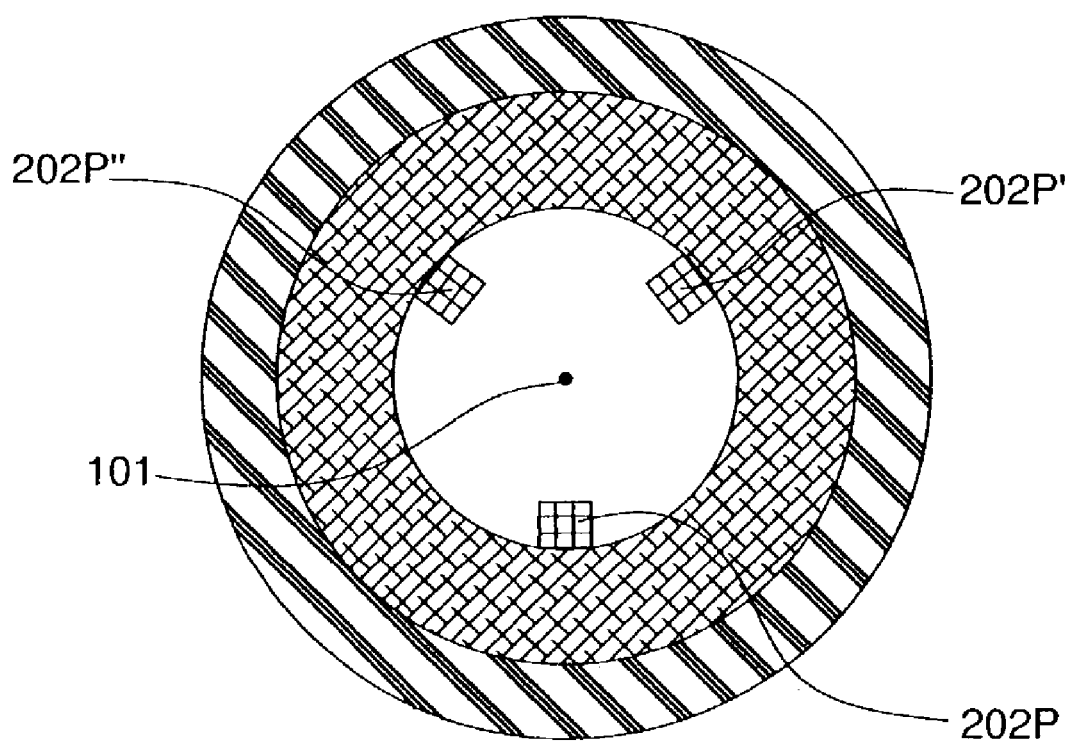
FIG. 5A is a cross-sectional of the output end of the nozzle, taken along line 5A—5A of FIG. 3, showing how three IHG sensors are arranged at that nozzle location to ensure that any hydrogen present at that location will be detected regardless of the orientation of the nozzle.

It should be noted that where the fueling nozzle 20 can be coupled to the fueling port 14 in any position rotated around its axis 101 (FIG. 3), it is possible that an IHG sensor, e.g., IHG sensor 202P, could be temporarily located at an elevation beneath the hydrogen gas leak point, thereby resulting in that leak being undetected by IHG sensor 202P. To prevent this from occurring, it may be necessary to position three IHG sensors around that particular location within the nozzle 20. For example, as shown in FIG. 5A, three IHG sensors, namely, IHG sensor 202P, 202P' and 202P" are displaced 120° around the inside circumference of the shroud 100P. Using this configuration, no matter in what angular position the nozzle 20 is coupled to the fueling port 14A, at least one of the IHG sensors 202P, 202P' and 202P" would detect a leak at that location, e.g., the location most likely to experience a leak would be at location 25 (FIG. 5), the coupling interface between the nozzle 20 and the fueling port 14.

Figure 6:
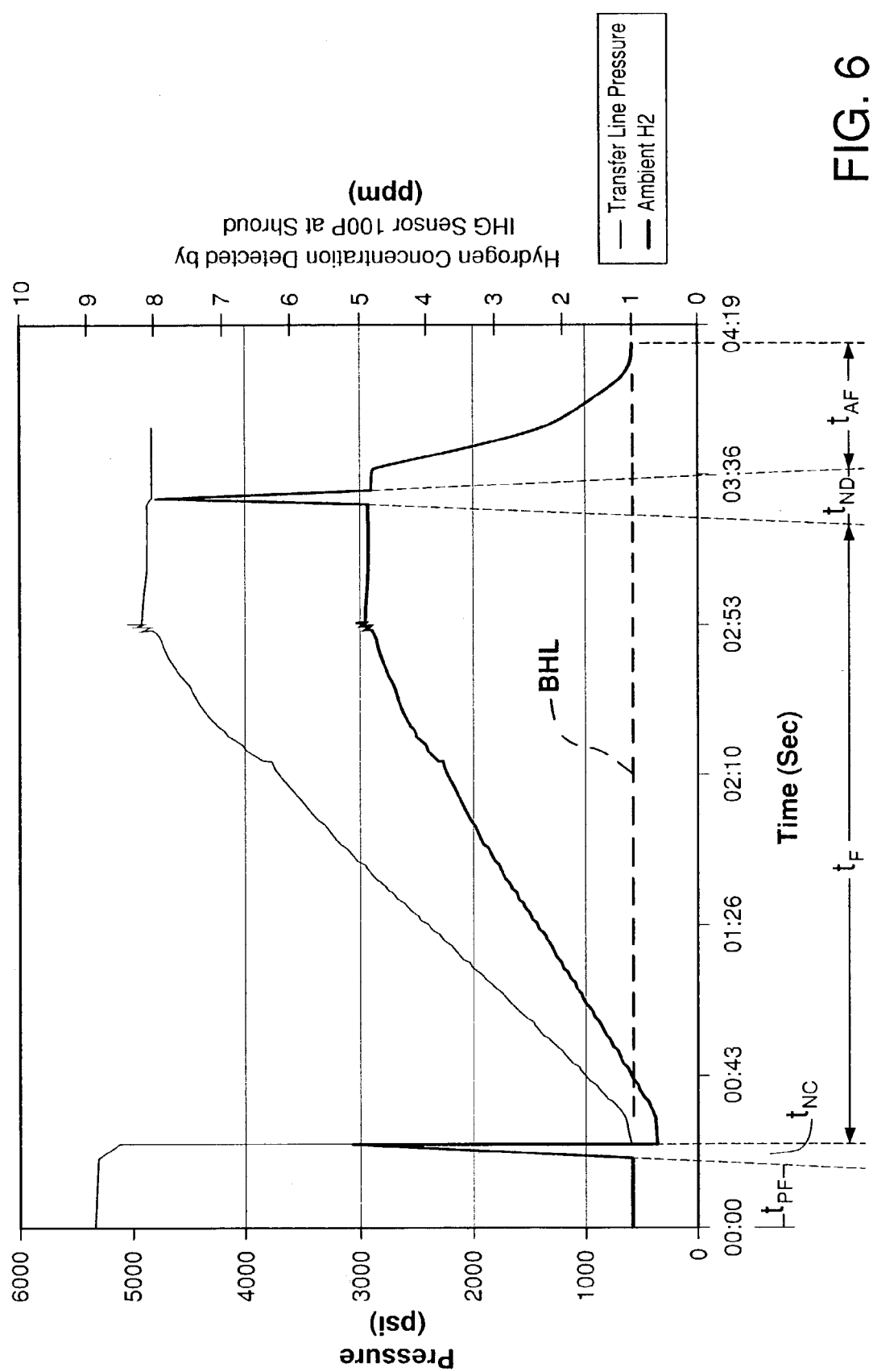
FIG. 6 is a profile of the hydrogen fueling process, with respect to a hydrogen sensor located at the nozzle shroud.

FIG. 6 depicts a typical hydrogen fueling process over time based on IHG sensor 100P at the nozzle shroud 202P which surrounds the nozzle output 206. In particular, before the nozzle 20 is coupled to the fueling port 14, IHG sensor 100P should only be detecting background hydrogen levels (BHL; see FIG. 6); this is defined as the pre-fueling stage, $t_{PF}$. As the nozzle 20 is coupled to the fueling port 14, IHG sensor 100P begins detecting the hydrogen concentration emitted from the fueling port 14 itself which causes the detected hydrogen concentration level to spike, during this nozzle coupling period, $t_{NC}$. Once the nozzle 20 is securely coupled to the fueling port 14, the fueling period, $t_F$, begins when the operator manipulates the handle 210 wherein hydrogen gas is delivered to the vehicle fuel tank 2A. As the hydrogen flow enters the nozzle 20, the pressure increases and some hydrogen may leak around the seal which is detected by the IHG sensor 100P, which is indicated by the slowly rising hydrogen concentration shown in FIG. 4. When the vehicle fuel tank 2A is filled, or otherwise terminated by the operator manipulating the handle 210, the operator then de-couples the nozzle 20 ($t_{ND}$) which causes the detected hydrogen level to spike. Once the nozzle is completely de-coupled, any finite amount of hydrogen gas released then dissipates; as a result, as shown in FIG. 6, during this "after fueling" period, $t_{AF}$, the IHG sensor 100P detects this decreasing hydrogen concentration level which returns to the BHL.

As can be appreciated, the key to the nozzle 20 of the present invention, as well as the monitoring and control system 22, is the IHG sensor 100. In order to accurately account for hydrogen leaks in a closed environment (e.g., low oxygen content) with high precision, these sensors 100 must:

be able to operate without the need for oxygen;
 avoid initiating an unsafe condition (e.g., avoid acting as an ignition source);
 respond to and be corrected for pressure changes;
 respond to a broad range of hydrogen concentrations in a wet (humidity 0
 100% and condensation) environment;
 respond to hydrogen changes without interference or false positive responses from other gas materials in and around the natural environment (e.g., hydrocarbons (such as methane or ethane), carbon monoxide, etc.);
 respond to hydrogen concentration changes in a broad range of environmental temperature conditions (−40° C. to 85° C.);
 respond to hydrogen concentration changes in a fast and efficient manner to differentiate with a high degree of confidence a 10% absolute H2 concentration increase from 100 ppm to >99%; and
 respond to hydrogen at a constant concentration and not become saturated to the point where performance is sacrificed.

Figure 7:
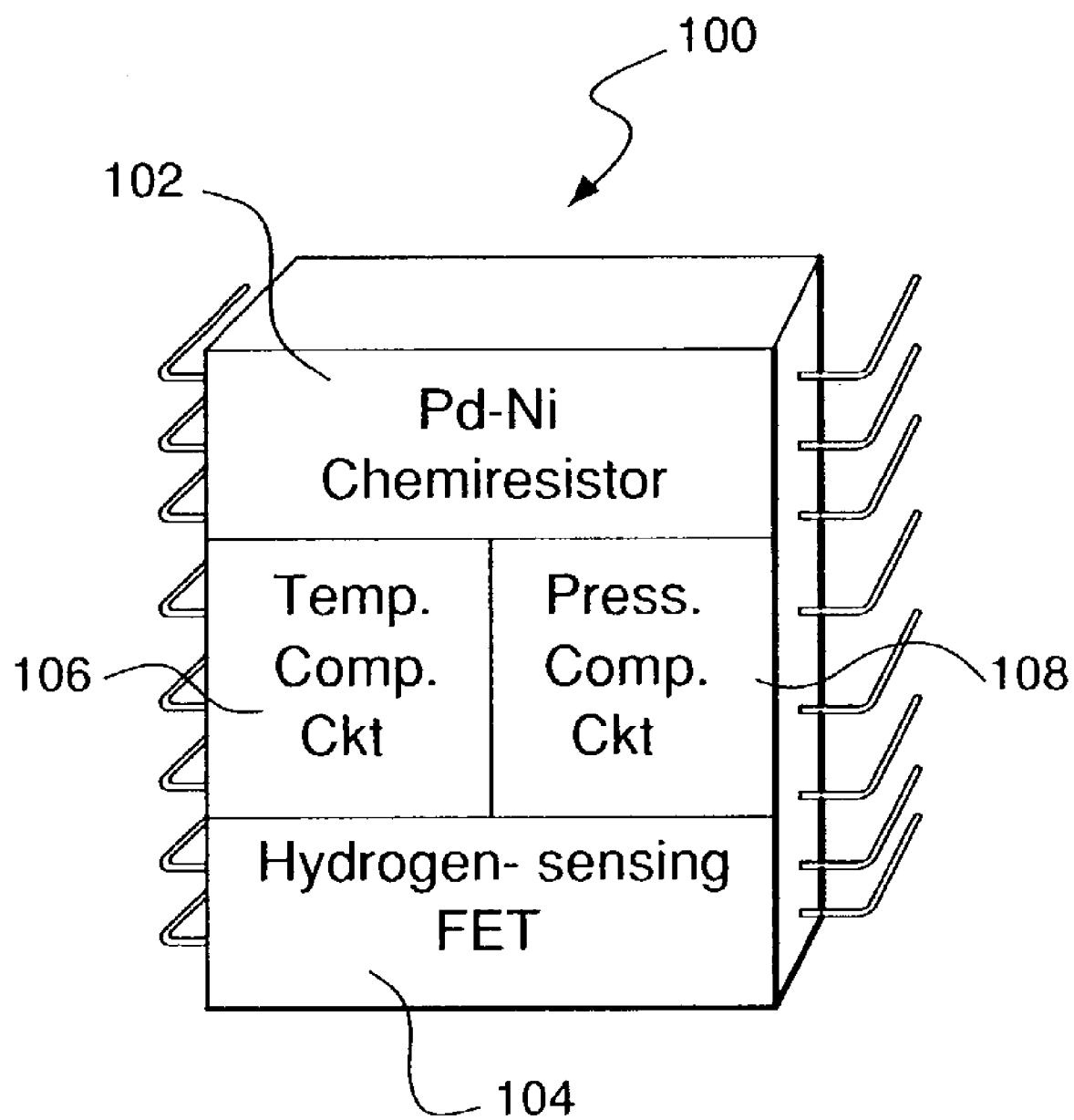
FIG. 7 is a functional diagram of a hydrogen gas sensor used inside the nozzle of the present invention.

A hydrogen gas sensor that can achieve these performance characteristics is presently sold under the tradename ROBUST HYDROGEN SENSOR™ by H2SCAN, LLC of Valencia, Calif. The H2SCAN sensor utilizes a two-part hydrogen-detection mechanism that permits the sensor to detect hydrogen concentrations over a broad range while remaining exclusively selective to hydrogen. In particular, as shown in FIG. 7, the H2SCAN sensor is an ASIC (application specific integrated circuit) comprising a hydrogen-sensing field effect transistor 104 (FET—also referred to as a MOS or MIS (metal-insulator-semiconductor) transistor/capacitor) for detecting low levels of hydrogen (e.g., 1 ppm–5000 ppm) and a palladium-nickel (Pd—Ni) chemiresistor 102 for detecting high levels of hydrogen (e.g., 2500 ppm–1×10$^6$ ppm).

Furthermore, each of these two hydrogen-detecting mechanisms 102/104 can be temperature-compensated and pressure-compensated by respective on-board circuitries 106/108. The construction and operation of the H2SCAN sensor is set forth in U.S. Pat. No. 5,279,795 (Hughes et al.) whose entire disclosure is incorporated by reference herein. In addition, Sandia National Laboratories Report SAND2000-8248, June 2000, entitled "A Small Form Factor Solid-State Hydrogen Sensor Package" by S. E. Fass and G. R. Dulleck provides further details about the H2SCAN sensor design and operation.

This H2SCAN sensor structure is unique in that only hydrogen atoms can diffuse into the sensor material to trigger the changes in electrical behavior, i.e., the H2SCAN sensor is selective for hydrogen. Alloying palladium with nickel prevents phase transitions in the thin films at high $H_2$ overpressures, making this sensor suitable for chemical process conditions. In particular, as stated in the product literature for the H2SCAN sensor, entitled "The DCH Robust Hydrogen Sensor™", the sensor:

. . . consists of a thin film of palladium-nickel (Pd/Ni) deposited on a silicon substrate that acts like a resistor in the presence of hydrogen. The lattice inherent in the Pd/Ni absorbs hydrogen molecules. As the number of hydrogen molecules increases in the lattice, the resistance of the Pd/Ni increases in direct correlation to the amount of hydrogen present. The thin film is embedded into an integrated circuit, which interprets this resistance and displays the hydrogen concentration to the operator. It also generates a voltage signal in direct correlation to the amount of hydrogen that can be interpreted by an external monitoring/control system. Since palladium only behaves in this manner with hydrogen, there is no cross-sensitivity of the sensor with any other elemental or compound gas . . .

Thus, no oxygen or other gas is required for the hydrogen-sensing FET 104/Pd—Ni chemiresistor 102 to function. Furthermore, the Pd—Ni chemiresistor 102 can continue to accurately detect hydrogen concentrations (e.g., 2500 ppm–1×10$^6$ ppm), whereas other conventional hydrogen sensors would otherwise saturate. This last feature is important because by not saturating, the H2SCAN sensor can continue to provide accurate hydrogen concentration levels to the controller 26; this uniquely allows the controller 26 to allow hydrogen transfer in those lines still operating safely while taking appropriate action (setting an alarm, shutting down a particular transfer, etc.) for transfers that have reached a first safety level (e.g., 10,000 ppm), thereby avoiding a "worst case scenario" by implementing an across-the-board shutdown of all transfers; in contrast, because conventional hydrogen sensors saturate at the first safety level, those monitoring systems must implement the worst case scenario action and shutdown all transfers.

It should be understood that in adapting the H2SCAN sensor for use internal to the nozzle 20 of the present invention, a new configuration of the H2SCAN sensor has been defined. Only one of the two hydrogen-detecting mechanisms 102/104 needs to be used on any of the IHG sensors 100 during nozzle 20 operation. In other words, each of the IHG sensors 100 is using only one of the hydrogen-detecting mechanisms while they are monitoring conditions inside the nozzle 20. In particular, the IHG sensors 100 (100B–100P) located at internal nozzle locations 202B–202P require only the Pd—Ni chemiresistor 102 while the IHG sensor 100 (100A) at location 202A (a coupling location between the nozzle 20 and the transfer line 3A) requires only the hydrogen-sensing FET 104. These particular hydrogen-detecting mechanisms are established based on the conditions at these nozzle locations.

For example, if a hydrogen gas leak occurs at locations 202B–202P, the hydrogen-sensing FET 104 would be quickly saturated and no longer provide an accurate measurement of the absolute hydrogen concentration. On the other hand, IHG sensor 100 (100A) at nozzle location 202A, which forms one of the most leak-tight points in the fueling system, hydrogen concentration levels at all times during the fueling process remain in the low range (e.g., 1 ppm–5000 ppm) where the hydrogen-sensing FET 104 accurately operates and to which the Pd—Ni chemiresistor 102 could not accurately detect. Thus, one of the novel aspects of the present invention 20 is that the IHG sensors 100 de-couple the concurrent operation of the Pd—Ni chemiresistor 102 and the hydrogen-sensing FET 104 of the H2SCAN sensor. As a result, each IHG sensor 100 may comprise a H2SCAN sensor with one of the two hydrogen-detecting mechanisms being activated, or in the alternative, may comprise a new ASIC having only one of the two hydrogen-detecting mechanisms thereon (i.e., Pd—Ni chemiresistor 102 or the hydrogen-sensing FET 104) along with the temperature-compensation circuitry 106 and the pressure compensation circuitry 108. An example of a sensor that comprises only the hydrogen-sensing FET is sensor model no. AS-FHH-400, or sensor model no. AS-FHH-450, both manufactured by AppliedSensor of Linköping, Sweden.

The IHG sensor 100O in the protection sleeve 202O is the only IHG sensor 100 that detects the hydrogen level in the immediate outside physical environment. This sensor is recessed inside the protective sleeve 202O to prevent any damage to the sensor during use.

Each of the IHG sensors 100 is continuously reporting hydrogen concentration levels to the controller 26. In monitoring the hydrogen gas flow, the controller 26 checks the data from each IHG sensor 100 to see if there is a 10% or greater change in hydrogen concentration level from the last reading, which is indicative of a possible leak.

The monitoring and control system 22 operates on safety limits which are in turn based on the lower explosive limit (LEL) of hydrogen in ambient air. As mentioned earlier, hydrogen is a flammable gas that can be ignited in ambient air at minimum concentration of 40,000 ppm or 4 volume %, i.e., the LEL of hydrogen in ambient air. The first safety level is defined as 10,000 ppm or 25% LEL (also referred to as 1 volume %). A second safety limit is 20,000 ppm or 50% LEL. In view of this, the monitoring and control system 22 takes action via the controller 26 activating the alarm 28 and/or controlling the shutoff valves 4A.

For those IHG sensors 100 monitoring the outside, immediate open air environment, i.e., IHG 100O, this sensor typically operates in atmospheric pressure (e.g., 0.8–1.2 bars) in the temperature range of −40° C. to 85° C. Where the hydrogen concentration level detected by this sensor 100O is within the "background hydrogen level-open air (BHL-OA)", e.g., 50–250 ppm v/v (with an error of approximately ±5 ppm), the operating condition is "normal". On the other hand, a leak can be manifested in several ways as detected by the IHG sensor 100O:

(1) if the IHG sensor 100O detects at least three consecutive hydrogen levels that are increasing (where each newly-detected hydrogen level ≧10% than the last detected hydrogen level, i.e., ≧10%/point);

(2) if the IHG sensor 100O detects a "major" hydrogen level jump, e.g., 100% hydrogen of BHL-OA (e.g., from 250 ppm to 99.5% hydrogen);

(3) detecting >10,000 ppm (25% of LEL) in one reading;

(4) detecting >20,000 ppm (50% of LEL) in one reading; or (5) detecting >40,000 ppm (LEL STATE) in one reading.

In processing this sensor's signals, the processor 26:

(1) considers hydrogen level readings from IHG sensor 100O that are <10,000 ppm v/v (25% of LEL) as normal operating conditions;

(2) activates an alarm and shuts down the particular hydrogen transfer for that nozzle whose IHG sensor 100O hydrogen levels ≧10,000 ppm (25% of LEL); however, adjacent nozzle hydrogen transfers continue.

For those IHG sensors 100 monitoring conditions inside the nozzle 20, these sensors (100A–100N and 100P) typically operate in atmospheric pressure (e.g., 0.8–1.2 bars) in the temperature range of −40° C. to 85° C. Where the hydrogen concentration level detected by these sensors 100A–100N and 100P is within the "background hydrogen level-inside nozzle (BHL-IN)", e.g., 50–5000 ppm v/v (with an error of approximately ±5 ppm), the operating condition is "normal". On the other hand, a leak can be manifested in several ways as detected by these IHG sensors 100A–100N and 100P:

(1) if any of these sensors 100A–100N and 100P detects at least three consecutive hydrogen levels that are increasing (≧10%/point) over 30 seconds;

(2) if any of these sensors 100A–100N and 100P detects a "major" hydrogen level jump, e.g., 100% hydrogen of BHL-IN (e.g., from 5000 ppm to 99.5% hydrogen);

(3) if any of these sensors 100A–100N and 100P detects >10,000 ppm (25% of LEL) in one reading;

(4) if any of these sensors 100A–100N and 100P detects >20,000 ppm (50% of LEL) in one reading; or (5) if any of these sensors 100A–100N and 100P detects >40,000 ppm (LEL STATE) in one reading.

In processing these sensors' signals, the processor 26:

(1) considers hydrogen level readings from all sensors 100A–100N and 100P that are <10,000 ppm v/v (25% of LEL) as normal operating conditions;

(2) activates an alarm and shuts down the particular hydrogen transfer for that nozzle if any IHG sensor 100A–100N and 100P hydrogen level ≧10,000 ppm (25% of LEL); however, adjacent nozzle hydrogen transfers continue.

Figure 8:
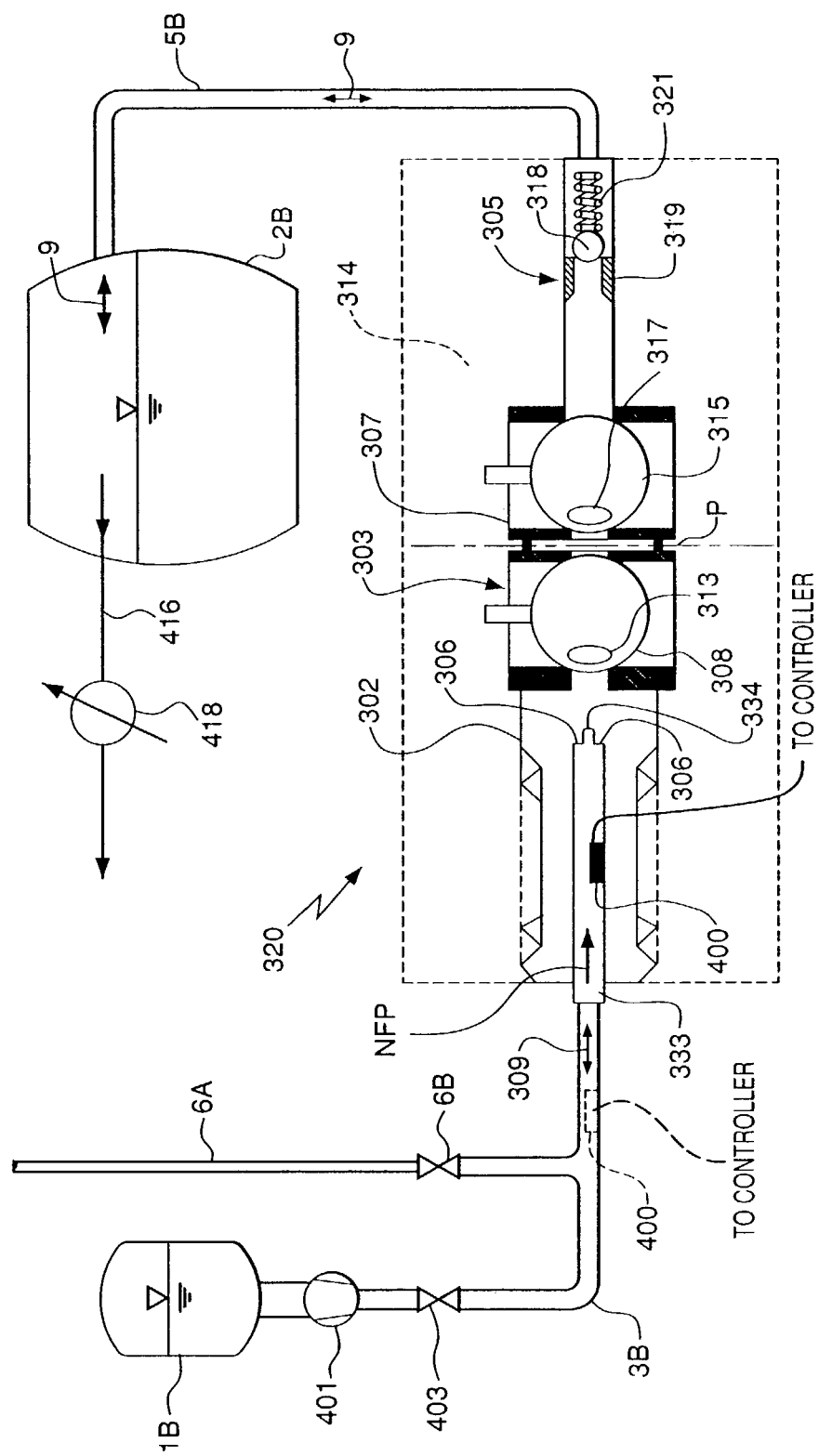
FIG. 8 is a functional diagram of a nozzle for transferring liquid hydrogen.

As mentioned earlier, it is within the broadest scope of the present invention to include a nozzle for transferring liquid hydrogen from one container to another container which can detect leaks and inform the monitoring and control system 22. By way of example only, a nozzle 320 for transferring liquid hydrogen is shown in FIG. 8, which is similar to the nozzle disclosed in European Patent Application EP 0574 811 entitled "Method for Cooling a Storage Container". In particular, as shown in FIG. 8, a hydrogen source tank 1B is connected to the input side of the nozzle housing 302 through a pump 401, a cryogenic check valve 403 and a vacuum-insulated hose 3B. The distal end 303 of the nozzle housing 302 comprises a cryogenic shut-off member 308. The distal end 303 of the nozzle housing 302 couples to a coupling port 314 which comprises a coupling socket 305 whose distal end 307 also comprises a cryogenic shut-off member 315. When these two distal ends 303/307 are coupled together at plane P, they form a pressure-tight housing. The output side of the coupling socket 305 is coupled to an opening in the storage container 2B via another vacuum-insulated hose 5B. Although not shown in FIG. 8, the controller 26 also controls the operation of the cryogenic valve 403 and pump 401.

The open end of a line-terminating tube 333 is slidably (the double-headed arrow 309 indicates the possible movement of the line-terminating tube 333) and concentrically-positioned within the input end of the nozzle housing 302 of the nozzle 320; the other end of the line-terminating tube 333 is coupled to the vacuum-insulated hose 3B. The line-terminating tube 333 comprises an output 306 for delivering liquid hydrogen and a projection 334, the purpose of which is discussed below. A relief line or vent stack 6A and cryogenic check valve 6B are coupled to the vacuum-insulated hose 3B. Each of the shut-off members 308/315 comprises a bore 313 and 317 that permit the line-terminating tube 333 to pass therethrough. When the line-terminating tube 333 is axially-positioned through the bores 313/317, a ball 318 is driven off its seat 319 against the bias of a spring 321, thereby allowing liquid hydrogen to pass through the nozzle output 306 and into the vacuum-insulated house 5B. Thus, liquid hydrogen is delivered to the storage container 2B. An output line 416 of the storage container 2B includes a heat exchanger 416 for warming the stored liquid hydrogen before use. Furthermore, as liquid hydrogen flows towards the storage container 2B from the nozzle 320 following the NFP, hydrogen gas from the storage container 2B exhausts back through the vacuum-insulated hose 5B towards the nozzle 320 (hence, the double-headed arrow 9) through the coupling port 314/nozzle 320 and safely out of the relief line 6A.

Because the operating conditions of transferring liquid hydrogen is different than transferring hydrogen gas, the methodology in detecting leaks is different. In particular, unlike the transfer of hydrogen gas, the transfer of liquid hydrogen involves only low pressures and the temperature during transfer of the liquid hydrogen is extremely low, e.g., approximately −252.8° C. Under normal circumstances, the nozzle 320 comprises 100% hydrogen. However, when there is no transfer of liquid hydrogen occurring, any of the cryogenic components, e.g., the shut-off members 406/408, may begin to leak, thereby allowing allow air to enter, possibly resulting in either oxygen or nitrogen freezing in the storage container 2B. Because it is much easier to detect a certain oxygen concentration in the liquid hydrogen flow, than it is detect a slight change in the hydrogen concentration, e.g., a change between 99.9% and 100% $H_2$, an oxygen sensor 400 is positioned inside the nozzle 320, preferably in the line-terminating tube 333, or alternatively, upstream of the liquid hydrogen flow, e.g., in the vacuum-insulated hose 3B.

The oxygen sensor 400 (e.g., Microsens' MSGS MGSM3000 $O_2$ monosensor) provides a signal to the controller 26 representative of the oxygen concentration level that it is detecting when the liquid hydrogen is not flowing. Because of the extreme cold temperature of the liquid hydrogen flow, the oxygen sensor 400 does not communicate with the controller 26 while liquid hydrogen is flowing; instead, the oxygen sensor 400 provides a signal to the controller 26 representative of the oxygen concentration level that it is detecting before the liquid hydrogen begins to flow and then after the flow has stopped. If the sensor 400 detects any oxygen in the nozzle 320 prior to initiating the liquid hydrogen flow, the sensor 400 informs the controller 26 about this detected oxygen level and the controller 26 activates the alarm 28, prevents a transfer system operator (or, if automated, a transfer controller, not shown) from initiating the liquid hydrogen transfer (e.g., by inhibiting the activation of cryogenic valve 403 and pump 404) and institutes an auto-purge phase to drive out the oxygen. Once the oxygen sensor 400 no longer detects any oxygen in the transfer system, the alarm 28 is de-activated and the transfer system is enabled to begin liquid hydrogen transfer.

Similarly, once the transfer of liquid hydrogen is completed and the temperature around the sensor 400 rises to approximately −183° C., the sensor 400 can begin again detecting for any oxygen that may have entered the flow path and thereby warn the controller 26 to auto-purge the flow path (as well as set the alarm 28 and prevent the transfer system operator, or transfer controller, from initiating another liquid hydrogen transfer) in preparation for the next liquid hydrogen transfer. If there is no oxygen detected, the controller 26 enables the next transfer of liquid hydrogen.

The oxygen sensor 400 (e.g., Microsens' MSGS 3000 monosensor) used therein may comprise a MOS-type construction wherein a metal oxide layer is doped with metal catalyst and covered with a charcoal/carbon filter to allow for selectivity of oxygen and to reduce cross interference. The sensor is deposited on platinum and insulated on a $SiO_x$ substrate. This construction can operate in extreme temperatures when working under a gas-to-liquid phase of hydrogen. The oxygen sensor 400 must be able to recover, after being exposed to −252.8° C. of the NFP of the liquid hydrogen for approximately 2–10 minutes and must respond to the gas phase of oxygen. Thus, the oxygen sensor 400 can detect the oxygen concentration at the start of the liquid hydrogen transfer and then again at the end of the transfer, when the gas phase condition has returned.

It should be understood that it is within the broadest scope of the apparatus and method of the present invention to include the determination or derivation of related parameters to detected hydrogen leaks during hydrogen transfer such as leak rate, leak energy, etc.

What is claimed is:

1. A nozzle for dispensing hydrogen gas from a hydrogen gas source into a container and for detecting hydrogen gas leaks, said nozzle comprising:
   a housing having a portion that is adapted for coupling to an opening of the container; and
   at least one sensor that is positioned inside said nozzle, said sensor detecting the concentration of hydrogen and emitting a signal indicative of the concentration of hydrogen.

2. The nozzle of claim 1 wherein said at least one sensor solely detects hydrogen and operates where no oxygen is present.

3. The nozzle of claim 2 wherein said at least one sensor comprises a palladium-nickel chemiresistor.

4. The nozzle of claim 2 wherein said at least one sensor comprises a hydrogen-sensing field effect transistor.

5. The nozzle of claim 2 wherein said at least one sensor comprises a plurality of sensors, each of which solely detects hydrogen and operates where no oxygen is present, each of said sensors emitting a respective signal indicative of the concentration of hydrogen that it is detecting, each one of said plurality of sensors being positioned at a respective location inside said nozzle.

6. The nozzle of claim 5 wherein each of said plurality of sensors comprises a palladium-nickel chemiresistor.

7. The nozzle of claim 5 wherein each of said plurality of sensors comprises a palladium-nickel chemiresistor and a hydrogen-sensing field effect transistor, said chemiresistor or said field effect transistor being active dependent upon said respective location of said sensor.

8. The nozzle of claim 5 comprising a shroud surrounding an output of said nozzle and wherein one of said plurality of sensors is positioned at said shroud.

9. The nozzle of claim 5 wherein one of said plurality of sensors is positioned inside a wall of said nozzle for detecting hydrogen concentrations in the open air immediately-adjacent said nozzle.

10. The nozzle of claim 5 including a coupling position between said nozzle and a transfer line from the hydrogen gas source and wherein one of said plurality of sensors is positioned inside said nozzle at said coupling position.

11. The nozzle of claim 10 wherein said one of said plurality of sensors that is positioned inside said nozzle at said coupling position comprises a hydrogen-sensing field effect transistor.

12. A method for detecting hydrogen gas leaks during the transfer of hydrogen gas from a hydrogen gas source into a container, said method comprising the steps of:
providing a nozzle, coupled at one end to a transfer line from the hydrogen gas source, and having an output at its other end;
positioning at least one sensor inside said nozzle, said at least one sensor emitting a signal indicative of the concentration of hydrogen it is detecting while hydrogen is being transferred;
coupling said at least one sensor to a controller, said controller receiving said signal indicative of the concentration of hydrogen;
coupling said output end of said nozzle to an opening of the container;
initiating transfer of hydrogen gas from the hydrogen gas source to the container; and
alerting an operator or shutting off the transfer of hydrogen gas, by said controller, whenever said controller determines that said received signal has reached or exceeds a predetermined hydrogen concentration.

13. The method of claim 12 wherein said step of positioning at least one sensor inside said nozzle comprises positioning at least one sensor inside said nozzle that detects only hydrogen and operates where no oxygen is present.

14. The method of claim 13 wherein said step of alerting an operator or shutting off the transfer of hydrogen gas comprises the steps of:
coupling said controller to a control valve coupled between the transfer line and said nozzle; and
automatically shutting down the transfer of hydrogen gas by said controller activating said control valve when said predetermined hydrogen concentration is reached or exceeded.

15. The method of claim 11 wherein said step of positioning at least one sensor inside said nozzle comprises:
locating a plurality of sensors inside said nozzle at respective locations therein; and
coupling each of said plurality of sensors to said controller so that said controller receives a respective signal indicative of the hydrogen concentration that each of said sensors is detecting.

16. The method of claim 15 wherein said step of locating a plurality of sensors inside said nozzle at respective locations therein comprises positioning a plurality of sensors inside said nozzle and wherein each one of said plurality of sensors detects only hydrogen and operates where no oxygen is present.

17. The method of claim 16 wherein said step of locating a plurality of sensors inside said nozzle comprises locating one sensor at a shroud that surrounds an output of said nozzle.

18. The method of claim 16 wherein said step of locating a plurality of sensors inside said nozzle comprises locating one sensor inside a wall of said nozzle for detecting a hydrogen concentration of the open air immediately-adjacent said nozzle.

19. The method of claim 16 wherein said step of locating a plurality of sensors inside said nozzle comprises locating one sensor at a coupling location between said nozzle and a transfer line from said hydrogen gas source.

20. A hydrogen gas transfer monitoring and control system for dispensing hydrogen gas from a hydrogen gas source into a container and for responding to hydrogen gas leaks, said monitoring and control system comprising:
at least one nozzle that is coupled to a hydrogen gas source via a transfer line and control valve, said nozzle comprising:
a housing having a portion that is adapted for coupling to an opening of the container; and
at least one sensor that is positioned inside said nozzle, said sensor detecting the concentration of hydrogen and emitting a signal indicative of the concentration of hydrogen; and
a controller, electrically-coupled to said at least one sensor and coupled to said control valve, said controller alerting personnel and/or controlling said control valve whenever said controller determines that said signal has reached or exceeds a predetermined hydrogen concentration.

21. The hydrogen gas transfer monitoring and control system of claim 20 wherein said at least one sensor solely detects hydrogen and operates where no oxygen is present.

22. The hydrogen gas transfer monitoring and control system of claim 21 wherein said at least one sensor comprises a palladium-nickel chemiresistor.

23. The hydrogen gas transfer monitoring and control system of claim 21 wherein said at least one sensor comprises a hydrogen-sensing field effect transistor.

24. The hydrogen gas transfer monitoring and control system of claim 21 wherein said at least one sensor comprises a plurality of sensors wherein each of said sensors emits a respective signal indicative of the concentration of hydrogen that it is detecting, each one of said plurality of sensors being positioned at a respective location inside said at least one nozzle.

25. The hydrogen gas transfer monitoring and control system of claim 24 wherein each one of said plurality of sensors solely detects hydrogen and operates where no oxygen is present.

26. The hydrogen gas transfer monitoring and control system of claim 25 wherein each of said plurality of sensors comprises a palladium-nickel chemiresistor.

27. The hydrogen gas transfer monitoring and control system of claim 25 wherein each of said plurality of sensors comprises a hydrogen-sensing field effect transistor.

28. The hydrogen gas transfer monitoring and control system of claim 25 wherein each of said plurality of sensors comprises a palladium-nickel chemiresistor and a hydrogen-sensing field effect transistor, said chemiresistor or said field effect transistor being active dependent upon said respective location of said sensor.

29. The nozzle of claim 24 comprising a shroud surrounding an output of said nozzle and wherein one of said plurality of sensors is positioned at said shroud.

30. The nozzle of claim 24 wherein one of said plurality of sensors is positioned inside a wall of said nozzle for detecting hydrogen concentrations in the open air immediately-adjacent said nozzle.

31. The nozzle of claim 24 including a coupling position between said nozzle and a transfer line from the hydrogen gas source and wherein one of said plurality of sensors is positioned inside said nozzle at said coupling position.

32. The nozzle of claim 31 wherein said one of said plurality of sensors that is positioned inside said nozzle at said coupling position comprises a hydrogen-sensing field effect transistor.

* * * * *